US 7,246,238 B2

(12) United States Patent
Mullen et al.

(10) Patent No.: US 7,246,238 B2
(45) Date of Patent: Jul. 17, 2007

(54) SYSTEM AND METHOD FOR PROVIDING INTEGRATION VIA A DIAL-UP INTERFACE

(75) Inventors: Glen H. Mullen, Baytown, TX (US); Matthew T. Novi, Jersey Village, TX (US); Shaun E. Neumann, Houston, TX (US); Abdullah Zahur, Houston, TX (US); Alexander J. C. Gaulene, Houston, TX (US); Sacha Dawes, Houston, TX (US); Johann Bazzali, Houston, TX (US)

(73) Assignee: Schlumberger Omnes, Inc., Houston, TX (US)

( * ) Notice: Subject to any disclaimer, the term of this patent is extended or adjusted under 35 U.S.C. 154(b) by 999 days.

(21) Appl. No.: 09/982,072

(22) Filed: Oct. 18, 2001

(65) Prior Publication Data
US 2003/0236984 A2 Dec. 25, 2003

Related U.S. Application Data

(60) Provisional application No. 60/264,101, filed on Jan. 25, 2001.

(51) Int. Cl.
*H04L 9/00* (2006.01)
(52) U.S. Cl. ..................................... 713/175; 726/15
(58) Field of Classification Search .................. 726/15
See application file for complete search history.

(56) References Cited

U.S. PATENT DOCUMENTS

| 4,578,530 A | 3/1986 | Zeidler ..................... 178/22.09 |
| 5,442,342 A | 8/1995 | Kung ..................... 340/825.34 |
| 5,497,421 A | 3/1996 | Kaufman et al. ............. 380/23 |
| 5,602,918 A | 2/1997 | Chen et al. ................... 380/21 |
| 5,679,007 A | 10/1997 | Potdevin et al. ........... 439/76.1 |
| 5,737,421 A | 4/1998 | Audebert ..................... 380/23 |
| 5,784,463 A | 7/1998 | Chen et al. ................... 380/21 |

(Continued)

FOREIGN PATENT DOCUMENTS

WO WO 99/57846 11/1999

OTHER PUBLICATIONS

PCT International Search Report dated Jun. 9, 2002, 5 pages.

(Continued)

*Primary Examiner*—Nasser Moazzami
*Assistant Examiner*—Brandon Hoffman
(74) *Attorney, Agent, or Firm*—Osha Liang LLP

(57) ABSTRACT

A network system providing integration. The network system includes a client computer, a server, a server-side cryptographic function, a PKI-Bridge, a remote access switch, a client-side cryptographic function, a dial-up client, and a custom script dynamically linked library. The server-side cryptographic function is located on the server and provides cryptographic services. The PKI-Bridge provides an interface between the server and the server-side cryptographic function. The remote access switch provides an interface between the client computer and the server. The client-side cryptographic function is located on the client computer and provides cryptographic services. The dial-up client provides dial-up services to access the remote access switch. The custom script dynamically linked library provides an interface between the dial-up client and the client-side cryptographic function.

30 Claims, 9 Drawing Sheets

U.S. PATENT DOCUMENTS

| | | | |
|---|---|---|---|
| 5,802,176 A | 9/1998 | Audebert | 380/23 |
| 5,887,065 A | 3/1999 | Audebert | 380/23 |
| 5,937,068 A | 8/1999 | Audebert | 380/23 |
| 6,050,494 A | 4/2000 | Song et al. | 235/492 |
| 6,061,796 A * | 5/2000 | Chen et al. | 726/15 |
| 6,158,011 A | 12/2000 | Chen et al. | 713/201 |
| 6,189,096 B1 | 2/2001 | Haverty | 713/155 |
| 6,377,691 B1 * | 4/2002 | Swift et al. | 380/277 |
| 6,772,341 B1 * | 8/2004 | Shrader et al. | 713/175 |

OTHER PUBLICATIONS

RFC 1334; Network Working Group, B. Lloyd et al., PPP Authentication Protocols, Oct. 1992, 13 pages.

RFC 1994; Network Working Group, W. Simpson et al., "PPP Challenge Handshake Authentication Protocol (CHAP)", Aug. 1996, 12 pages.

RFC 2058, Network Working Group, C. Rigney et al., "Remote Authentication Dial in User Service (RADIUS)", Jan. 1997, 65 pages.

RFC 2284, Network Working Group, L. Blunk et al., "PPP Extensible Authentication Protocol (EAP)", Mar. 1998, 16 pages.

RFC 2716, Network Working Group, B. Aboda et al., "PPP EAP TLS Authentication Protocol", Oct. 1999, 25 pages.

Foreign Art Search Report dated May 3, 2006.

* cited by examiner

SYSTEM AND METHOD FOR PROVIDING INTEGRATION VIA A DIAL-UP INTERFACE

This application claims benefit of U.S. provisional application Ser. No. 60/264,101, filed Jan. 25, 2001.

BACKGROUND OF INVENTION

Computers are used to perform a wide assortment of tasks. Often computers are connected together as a group of computers known as a network workgroup. Referring to FIG. 1, a network workgroup is made up of a first client (10), a second client (12), a third client (14), and a shared printer (16) each having a network connection (18), for example, an Ethernet connection. Using a router (20), a connection is made to a remote network via a hub (22). Connected to the hub (22) are a remote shared printer (28), a first remote client (24), a second remote client (26), and a file server (30). The entire networked workgroup is able to connect to a wide area network (32), e.g., the Internet, via the router (20). Connecting to the network via remote access is increasing in popularity as users seek to use computers away from the central network workgroup. In such cases, a remote client computer is connected to the central network group via a telephone line and a communication device known as a modem.

Managing dispersed serial connections and modem pools for large numbers of users creates the need for significant administrative support. Because modem pools are a link to the outside world, modem pools require careful attention to security and authorization. Remote Authentication Dial-In User Service (RADIUS) handles these authentication and configuration issues by managing a single "database" of users. This allows for authentication (verifying user name and password) as well as configuration information detailing the type of service to deliver to the user (e.g., Point-to-Point Protocol (PPP), telnet, or rlogin). PPP is a widely used data link protocol for transmitting Transfer Control Protocol/Internet Protocol (TCP/IP) packets over dial-up telephone connections. Telnet is a protocol that enables an Internet user to log on to and enter commands on a remote computer linked to the Internet, as if the user were using a text-based terminal directly attached to that computer. Telnet is part of the TCP/IP suite of protocols. Rlogin is a protocol used to log on to a networked computer in which the local system automatically supplies the user's login name.

In a network workgroup, a Network Access Server (NAS) operates as a client of a server. The NAS provides a service to the dial-in user, such as PPP or Telnet. The client is responsible for passing user information to designated servers, and then acting on the response returned. Servers are responsible for receiving user connection requests, authenticating the user, and then returning all configuration information necessary for the client to deliver service to the user. The server can also act as a proxy client to other servers or other kinds of authentication servers.

In an effort to maintain network security, transactions between the client and server are authenticated through the use of a secret shared between the client and the server. This secret is never sent over the network. In addition, any user passwords sent between the client and server use a mechanism to maintain data integrity, e.g., MD5 Checksum, to eliminate the possibility that someone snooping on an unsecured network can determine a user password.

When the server is provided with the user name and original password input by the user, the server authenticates the user name and password through an authentication mechanism. The authentication mechanism is typically one of the following mechanisms: PPP, Extensible Authentication Protocol (EAP), Challenge Handshake Authentication Protocol (CHAP), or UNIX login. New attribute values can be added to the authentication mechanisms without disturbing existing implementations of the RADIUS server protocol.

When a client is configured to use RADIUS, any user of the client presents authentication information to the client. This might be with a customizable login prompt, where the user enters a username and password. Alternatively, the user might use a link framing protocol such as PPP or EAP, which has authentication packets carrying this information. Once the client obtains such information, the client may choose to authenticate using RADIUS.

PPP provides a standard method for transporting multi-protocol datagrams (packets of information, along with relevant delivery information such as the destination address that is sent through a packet-switching network) over point-to-point links. PPP also defines an extensible Link Control Protocol (LCP), which can be used to negotiate authentication methods, as well as an Encryption Control Protocol (ECP), used to negotiate data encryption over PPP links, and a Compression Control Protocol (CCP), used to negotiate compression methods.

EAP is a general protocol for PPP authentication that supports multiple authentication mechanisms. EAP does not select a specific authentication mechanism at a Link Control Phase. Rather, the specific authentication mechanism selection is postponed until an Authentication Phase. This postponement allows a PPP authenticator to request more information before determining the specific authentication mechanism. This also permits the use of a "back-end" server, such as a RADIUS server, which actually implements the various mechanisms while the PPP authenticator merely acts as a conduit for the authentication exchange. Through the use of EAP, support for a number of authentication schemes may be added, including smart card, public key, one time password, etc. To date, however, EAP methods have focused on authenticating a client to a server. The EAP protocol allows a PPP peer to take advantage of the integrity-protected ciphersuite (scrambled or otherwise encoded text) negotiation, mutual authentication, and key management capabilities of the Transfer Level Security (TLS) protocol.

A smart card is a credit card-sized, tamper-resistant security device that offers functions for secure information storage and information processing that relies on Very-Large-Scale Integration (VLSI) chip technology. VLSI is generally considered to encompass the range from 5,000 to 50,000 components densely packed in an integrated circuit. A smart card contains a secure microprocessor chip embedded in the card. The chip can implement a secure file system, compute cryptographic functions, and actively detect invalid access attempts. With proper application of file system access rights, a smart card can be safely used by multiple, independent applications.

The basic principle of Public Key Infrastructure (PKI) technology is a mathematical concept that can be used to relate certain pairs of large numbers (called keys) in a special way. If one of the keys is used to encrypt a message, the other key can be used to decrypt the message, and vice versa. Fundamental to this scheme is that only these two keys (called a key pair) are related in this way. So, in other words, if a message is encrypted with one key, the message can be decrypted only by the matching key in the pair. One key is called a private key and the other is called a public key. The private key is known only by the user; the public key is published as widely as the user desires.

The following is an example of how a private message is sent from a sender to a recipient. The recipient's public key is used to encrypt the message, which is then sent to the recipient. The recipient uses his/her private key to decrypt the message. The sender knows that only the recipient can read the message because the message can only be decrypted using the recipient's private key. One concern with this arrangement is that the sender does not know whether the recipient's true public key is being used to encrypt the message. To overcome this concern, a certificate is employed.

A certificate binds a public key to an identity (and possibly other information about that identity). The sender and recipient share a trusted third party (e.g. a mutual friend, an organizational administrator, or a government agency). If the recipient goes to that trusted third party and proves his/her identity and presents his/her public key, that third party bundles and "signs," or verifies the authenticity of the public key along with the recipient's identity and any other appropriate information. This bundle of information is called a certificate, and the process of obtaining one is called certificate issuance.

A notable property of certificates is that public key tampering can be readily detected. The certificate is signed by the trusted third party (called a certificate authority, or CA). If the certificate is tampered with, the sender can tell because the CA is not recognized or the certification is improperly signed. Further, the sender can look at the certificate and verify that the certificate was, in fact, signed by the intended trusted third party. This mechanism assures that the recipient's public key really belongs to the recipient, at least to the level that trust exists in the CA.

A security management system, for instance, Entrust/ Entelligence developed by Entrust Technologies of Plano, Tex., manages certificates, time stamping, encryption, digital signatures, and other security issues on behalf of users. Security management systems, such as Entrust/Entelligence, also have features such as automatic key and certificate management, and centrally managed policies and settings. Entrust/Entelligence integrates into a client computer environment. Also, instead of a separate log in procedure for each application stored on the computer, a user logs in only once to securely access all applications that are secured with a product such as Entrust/Entelligence.

Certificates used to verify a signed document may be stored on a server running a directory service. A directory service is a service running on a network that enables users to locate hosts and services, e.g., a certificate management service. An example of a directory service is Lightweight Directory Access Protocol (LDAP).

LDAP is the Internet standard for directory lookups, just as the Simple Mail Transfer Protocol (SMTP) is the Internet standard for delivering e-mail, and the Hypertext Transfer Protocol (HTTP) is the Internet standard for delivering documents. Technically, LDAP is defined as an "on the wire" bit protocol (similar to HTTP) that runs over Transmission Control Protocol/Internet Protocol (TCP/IP). LDAP creates a standard way for applications to request and manage directory information.

An LDAP-compliant directory leverages a single, master directory that owns all user, group, and access control information. The directory is hierarchical, not relational, and is optimized for reading, reliability, and scalability. This directory becomes a specialized, central repository that contains information about objects and provides user, group, and access control information to all applications on the network. For example, the directory can be used to provide a security management system with a user list, a user's public key information, or user identification for all users in a widely distributed enterprise.

SUMMARY OF INVENTION

In general, in one aspect, the invention comprises a network system providing integration. The network system comprises a client computer, a server, a server-side cryptographic function providing cryptographic services located on the server, a PKI-Bridge providing an interface between the server and the server-side cryptographic function, a remote access switch providing an interface between the client computer and the server, a client-side cryptographic function providing cryptographic services located on the client computer, a dial-up client providing dialing services to access the remote access switch, and a custom script dynamically linked library providing an interface between the dial-up client and the client-side cryptographic function.

In general, in one aspect, the invention comprises a network system providing integration. The network system comprises a client computer, a server, a server-side cryptographic function providing cryptographic services located on the server, a PKI-Bridge providing an interface between the server and the server-side cryptographic function, a remote access switch providing an interface between the client computer and the server, a client-side cryptographic function providing cryptographic services located on the client computer, a dial-up client providing dialing services to access the remote access switch, a custom script dynamically linked library providing an interface between the dial-up client and the client-side cryptographic function, a security device holding authentication information, a card reader attached to the client computer for reading the security device, and a directory service accessed by the server-side cryptographic function.

In general, in one aspect, the invention comprises a client computer. The client computer comprises a dial-up client providing dialing services to the client computer, a client-side cryptographic function providing cryptographic services located on the client computer, a custom script dynamically linked library providing an interface between the dial-up client and the client-side cryptographic function, and a card reader attached to the client computer for reading a security device.

In general, in one aspect, the invention comprises a server. The server comprises a server-side cryptographic function providing cryptographic services located on the server, a PKI-Bridge providing an interface between the server and the server-side cryptographic function, and a directory service accessed by the server-side cryptographic function.

In general, in one aspect, the invention comprises a method of integrating via a dial-up interface. Session initiation information is sent from a dial-up client to a PKI-Bridge. Session initiation information is checked by the PKI-Bridge. A challenge string is generated by a server-side cryptographic function. The challenge string is forwarded to a custom script dynamically linked library. The challenge string is forwarded to a client-side cryptographic function from the custom script dynamically linked library. A private key is retrieved from a security device. A response string is generated. The response string is signed with the private key of a dial-in user. A signed response string is forwarded to the custom script dynamically linked library. The signed response string is divided into packets. Packets are forwarded to the PKI-Bridge. The signed response string is reconstructed from packets. A reconstructed signed response string is forwarded to the server-side cryptographic function. A public key of the dial-in user is obtained. The reconstructed signed response string is verified using the server-side cryptographic function.

In general, in one aspect, the invention comprises a method of integrating via a dial-up interface. Session initiation information is sent from a dial-up client to a PKI-Bridge. Session initiation information is checked by the PKI-Bridge. A challenge string is generated by a server-side cryptographic function. The challenge string is forwarded to a custom script dynamically linked library. The challenge string is forwarded to a client-side cryptographic function from the custom script dynamically linked library. A private key is retrieved from a security device. A response string is generated. The response string is signed with the private key of a dial-in user. A signed response string is forwarded to the custom script dynamically linked library. The signed response string is divided into packets. Packets are forwarded to the PKI-Bridge. The signed response string is reconstructed from packets. A reconstructed signed response string is forwarded to the server-side cryptographic function. A public key of the dial-in user is obtained. The reconstructed signed response string is verified using the server-side cryptographic function. A card reader reads the security device. The signed response string is encoded. The signed response string is decoded. The challenge string is forwarded to the dial-up client. The challenge string is forwarded to the PKI-Bridge. Packets are forwarded from the custom script dynamically linked library.

In general, in one aspect, the invention comprises an apparatus of integrating via a dial-up interface. The invention comprises means for sending session initiation information from a dial-up client to a PKI-Bridge, means for checking session initiation information by the PKI-Bridge, means for generating a challenge string by a server-side cryptographic function, means for forwarding the challenge string to a custom script dynamically linked library, means for forwarding the challenge string to a client-side cryptographic function from the custom script dynamically linked library, means for retrieving a private key from a security device, means for generating a response string, means for signing the response string with the private key of a dial-in user, means for forwarding a signed response string to the custom script dynamically linked library, means for dividing the signed response string into packets, means for forwarding packets to the PKI-Bridge, means for reconstructing the signed response string from packets, means for forwarding a reconstructed signed response string to the server-side cryptographic function, means for obtaining a public key of the dial-in user, and means for verifying the reconstructed signed response string using the server-side cryptographic function.

Other aspects and advantages of the invention will be apparent from the following description and the appended claims.

DETAILED DESCRIPTION

Figure 1:
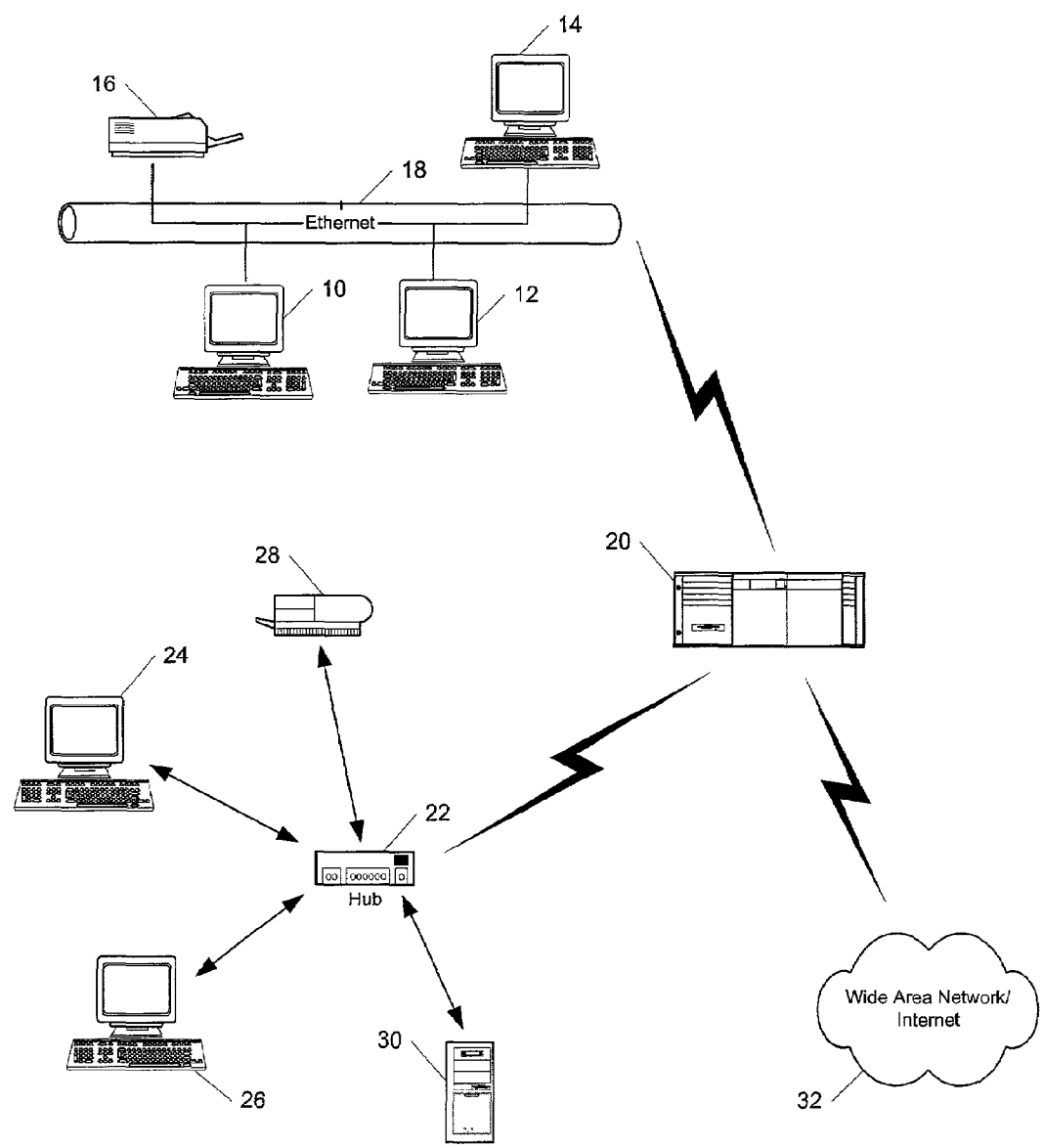
FIG. 1 illustrates a typical network workgroup.

Specific embodiments of the invention will now be described in detail with reference to the accompanying figures. Like elements in the various figures are denoted by like reference numerals for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
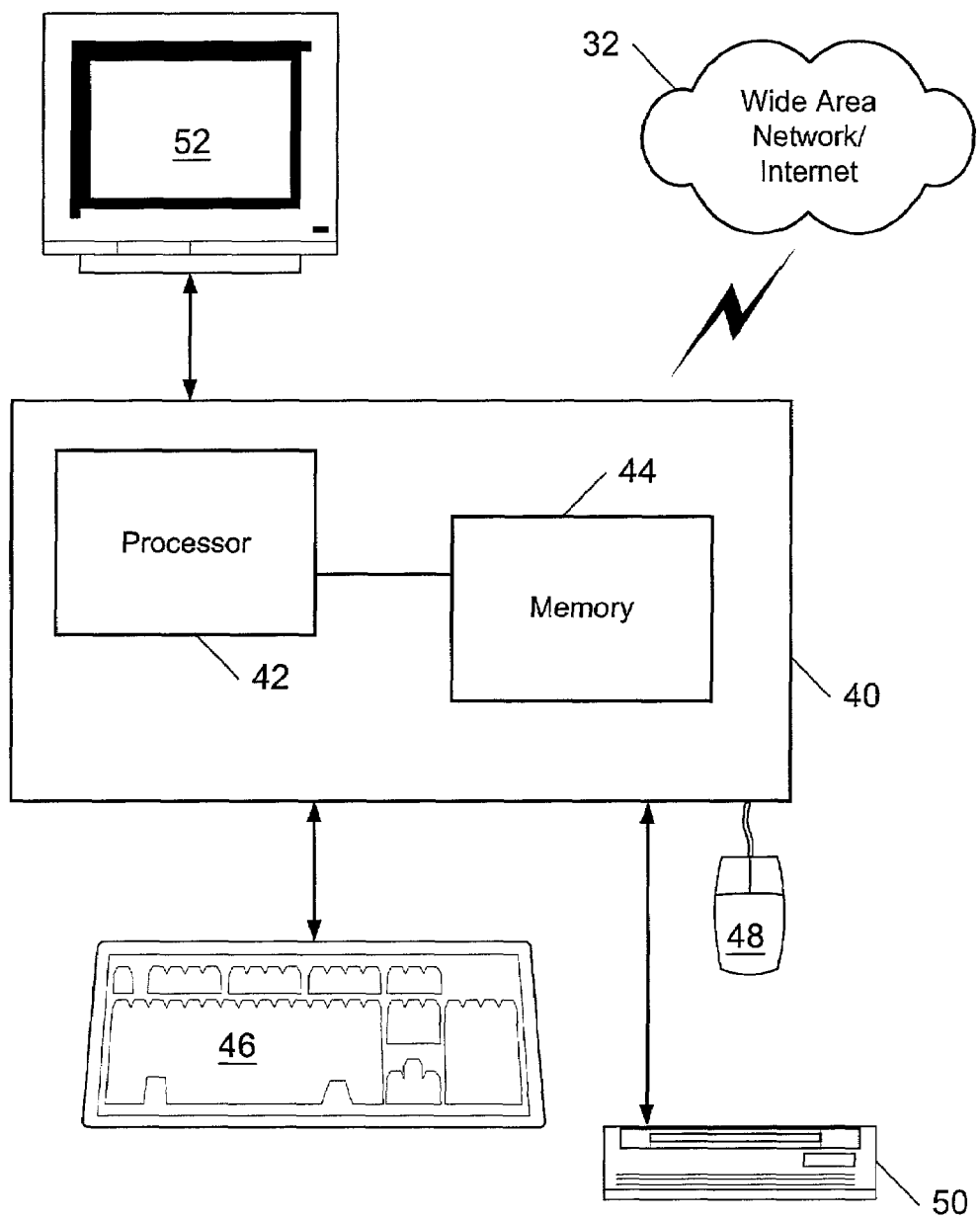
FIG. 2 illustrates a typical computer system.

The invention described herein may involve any computer regardless of the platform being used. For example, as shown in FIG. 2, a typical computer (40) has a processor (42), memory (44), and numerous other elements and functionalities typical to today's computers (not shown). The computer (40) has associated therewith input means such as a keyboard (46), a mouse (48), and a card reader (50), although in an accessible environment these input means may take other forms. The computer (40) is also associated with an output device such as a display (52), which may also take a different form in an accessible environment. Finally, the computer (40) is connected to a wide area network (32), such as the Internet.

Figure 3:
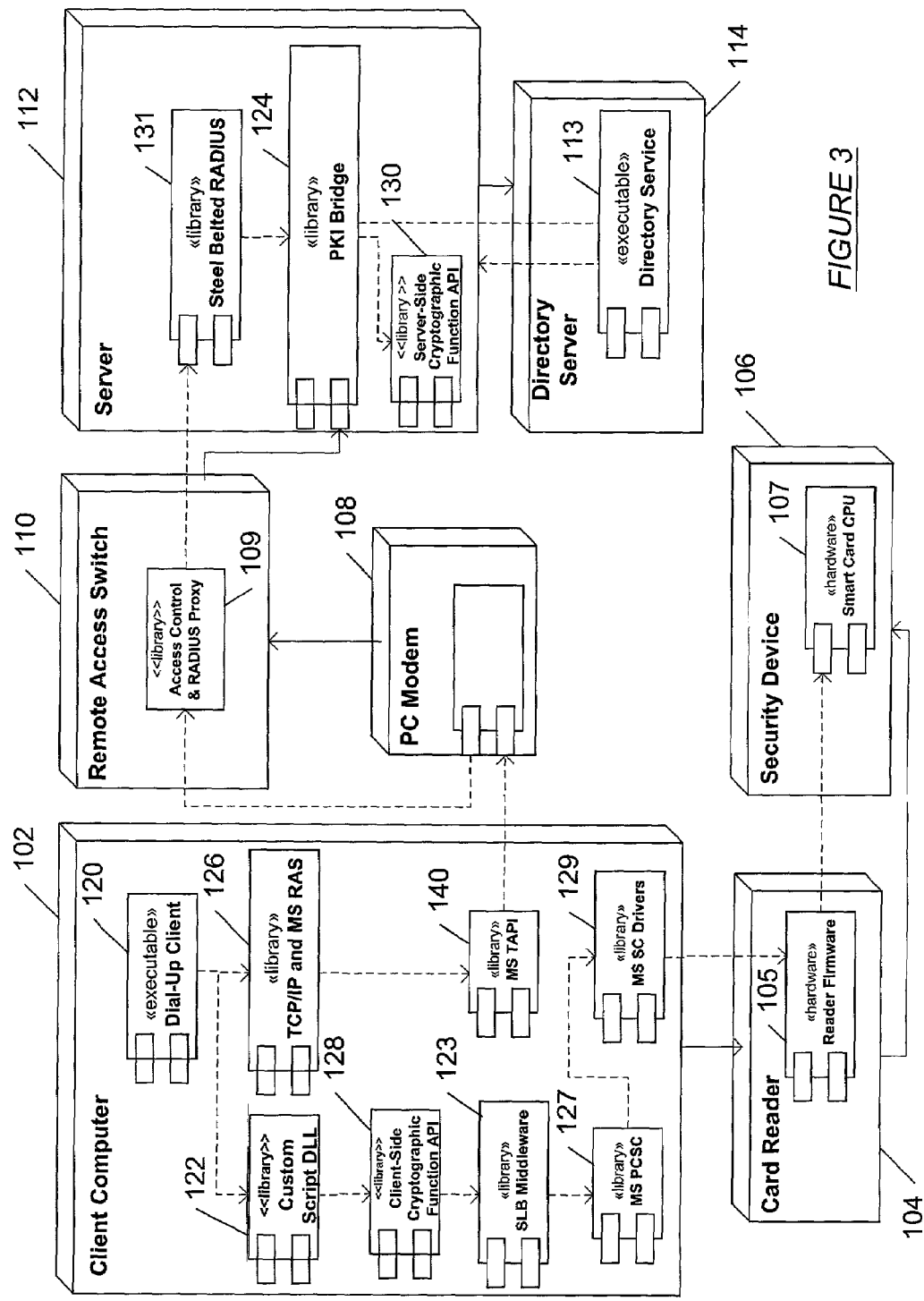
FIG. 3 illustrates a block diagram of a system in accordance with an embodiment of the present invention.

In one or more embodiments, the present invention involves a network system described herein as SmartDial. SmartDial is a Remote Access Server (RAS)-Public Key Infrastructure (PKI) product that integrates security devices, (e.g., smart cards), a PKI encryption system (e.g., Entrust), and a server (e.g., RADIUS) via a dial-up interface. Referring to FIG. 3, SmartDial involves the integration of numerous components including a client computer (102), a card reader (50) with reader firmware (105), a security device (106) (e.g., a smart card) with an embedded CPU (107), a PC modem (108) individually or as part of a modem pool (not shown), a Network Access Point (NAP), e.g., Remote Access Switch (110) with an Access Control and a RADIUS Proxy library (109), a server (112), e.g., a RADIUS server, and a Directory Service (113), e.g., a LDAP-compliant directory, located on a directory server (114).

For successful integration of all components, a plurality of custom modules and programming interfaces are required. Referring to FIG. 3, a first custom module is a dial-up client (120), which is an executable program. A second custom module is a Custom Script Dynamically Linked Library (DLL) (122). A DLL is a feature of the Microsoft Windows® operating system and OS/2 that allows executable routines to be stored as files with DLL extensions and to be loaded only when needed by a program. In the present invention, the Custom Script DLL implements integration between a Security Management System with a client-side cryptographic function (128), e.g., Entrust/Entelligence, and a PKI-Bridge (124) using a SmartDial Authentication Protocol (SDAP). The first and second custom modules are considered part of the client computer (102). A third custom element is the PKI-Bridge (124), which is a library and is stored on the server (112).

In addition to the custom modules, in one or more embodiments SmartDial may also contain a number of programming interfaces, such as an Application Programming Interface (API). The API is a set of routines used by an application program to direct the performance of procedures by the computer operating system. A first programming interface is a TCP/IP and Microsoft® RAS library (126) to allow the client computer (102) to connect to the server (112) through the PC modem (108) and the Remote Access Switch (110). A second programming interface is a client-side cryptographic function (128) allowing the dial-up client (120) and the Custom Script DLL (122) to connect to the card reader (104) for integration with a security device (106). Additionally, Schlumberger (SLB) proprietary Middleware (123), which is a library together with a proprietary smart card interface, e.g., Microsoft® PCSC (127), and a proprietary smart card device driver, e.g., Microsoft® SC drivers (129), facilitate the connection between the Custom Script DLL (122) and the card reader (104). A fourth programming interface is a server-side cryptographic function (130) to allow the server (112) and a Steel Belted RADIUS library (131) to integrate with a directory service (113) on the directory server (114).

Several of the main components of SmartDial listed above are described in greater detail below. Following the discussion of the main components is a description of a typical implementation of the components of SmartDial.

The dial-up client (120) is an executable file that loads and executes the code in the Custom Script DLL (122). Further, in one or more embodiments, there are two primary components within the dial-up client (120) that provide the necessary functionality to the dial-up client (120): a SDLogin component and a SDSetupDial component.

The SDLogin component is called by the dial-up client (120) when it is initially started, i.e., the user double clicks an icon to start the application. The SDLogin component may be called again when dialing is about to begin. The SDLogin component allows the dial-up client (120) to logon onto the client-side cryptographic function (128).

The SDSetupDial component is called by the dial-up client (120) immediately before the dialing begins. The SDSetupDial component allows a user to terminate dialing, and provides the user information about the sending status updates and errors. In one embodiment of the present invention, information provided to a user is stored on a shared memory page.

In one or more embodiments of the dial-up client (120), using the above-mentioned components, automates the authentication process using a hidden terminal operating in terminal mode. Terminal mode allows data to be transferred via a traditional telephone line in text (ACSII) format. Additionally, the data may be encoded, e.g., base 64 encoding. The dial-up client (120) provides an interface between the Security Management System with a client-side cryptographic function (128), e.g., Entrust/Entelligence, and the Remote Access Switch (110). The client-side cryptographic function (128) provides an interface that can be used to access user certificates from a security device (106) via the appropriate hardware and software components. The client-side cryptographic function (128) is also responsible for responding to a challenge, from the server-side cryptographic function (130) with a signed response string. The signing of the response string includes first hashing data to be sent using a hashing algorithm, such as MD5. The hashed data is then encrypted using a PKI encryption algorithm using the private key of the sender. The result is a digital signature of the response string.

Additionally, all data passed between the client computer (102) and the PKI-Bridge (124) is modified by the Custom Script DLL (122) to coincide with SDAP. Further, when sending the signed response string, the formatted signed response string is divided into packets and sent to the PKI-Bridge (124). This is required because response strings are typically large, e.g., 3 K bytes, thus it is difficult to send as one package due to bandwidth limitations of a data line, e.g., telephone lines.

In one or more embodiments, the dial-up client (120) may perform several additional functions. The dial-up client (120) allows a dial-up user to dial into the Remote Access Switch (110) (e.g., Shiva, Cisco, or other access vendor that support RADIUS servers) using a number selected by the user and provide status information about the dial-up connection. The dial-up client (120) also establishes PPP protocol and interfaces with e-mail service components for a phone book and associated protocols. For security purposes, the dial-up client (120) does not store any part of the information obtained from the client-side cryptographic function (128). Also, the dial-up client (120) does not store the challenge string or the signed response string.

In one or more embodiments, the dial-up client (120) provides several user interface components, including a phone number and modem setup screen, a connection information dialog box, a dial-up monitor, numerous error dialog boxes, and numerous reconnection dialog boxes. In the case that the user has not connected to the certificate manager, an input screen for the user password is displayed. The dial-up client (120) allows for the termination of a session via a cancel button on the connection information dialog box. Each service provided by the Remote Access Switch (110) to a dial-in user constitutes a session, with the beginning of the session defined as the point where service is first provided and the end of the session defined as the point where service is ended. In the case of abnormal termination of the session, the dial-up client (120) automatically displays a reconnection dialog box to allow the user to re-establish the session. The dial-up client (120) also announces a desire to use SDAP before any other authentication protocols.

Figure 4:
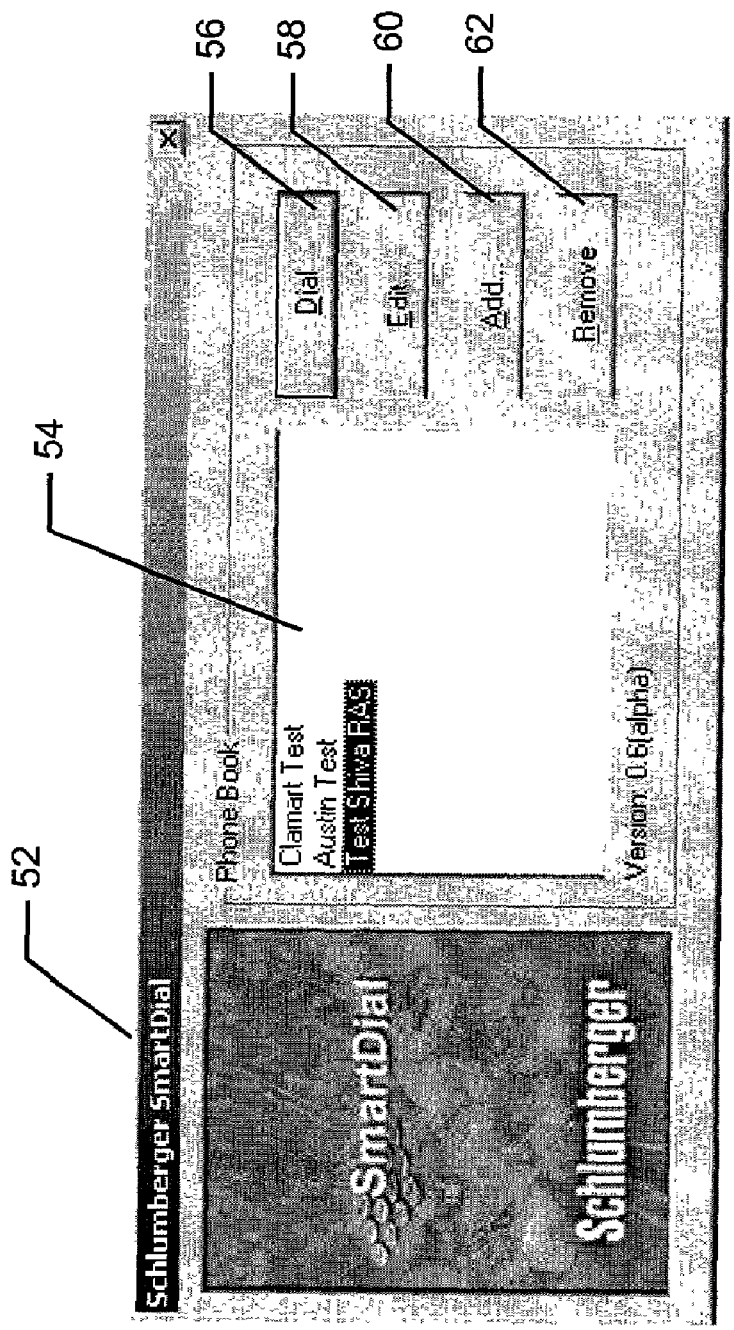
FIG. 4 illustrates a user interface for a phone number and modem setup dialog box, in accordance with one or more embodiments of the present invention.

A typical phone number and modem setup dialog box, in accordance with one or more embodiments of the present invention, is shown in FIG. 4. A dialog box (52) contains a listing of phone book entries (54) associated with phone numbers to access a remote server. The dialog box (52) also contains a button to add a phone book entry (60), a button to remove a phone book entry (62), and a button to edit a phone book entry (58). Further, the dialog box (52) contains a button to dial the phone number associated with a selected phone book entry (56).

Figure 5:
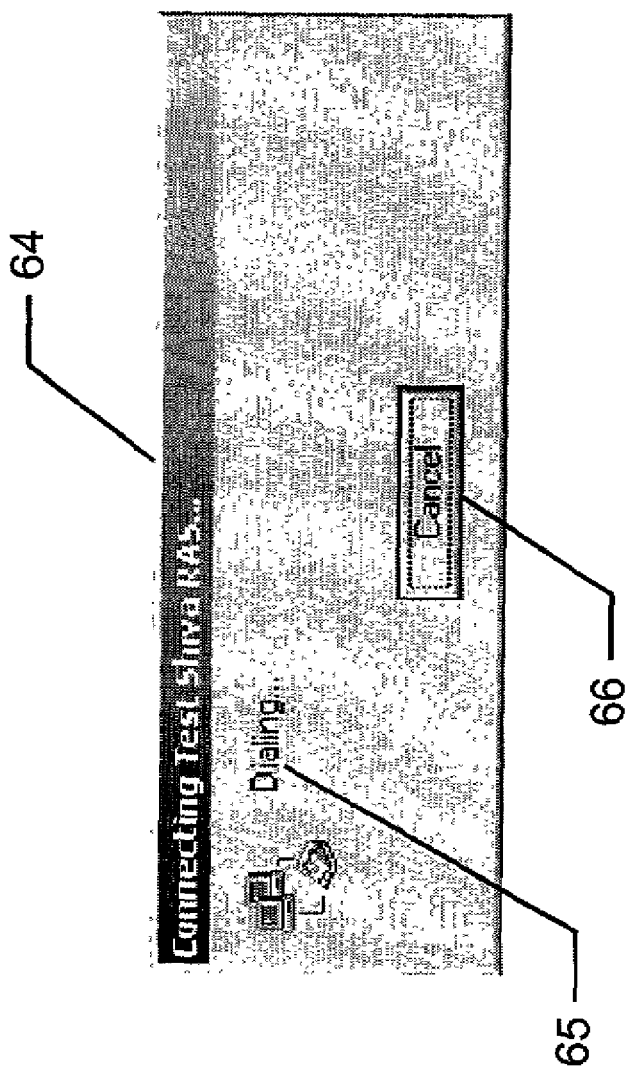
FIG. 5 illustrates a user interface for a connection information dialog box, in accordance with one or more embodiments of the present invention.

A typical connection information dialog box, in accordance with one or more embodiments of the present invention, is shown in FIG. 5. A dialog box (64) informs the user of the progress of the connection. The dialog box (64) includes a text dialog (65) that indicates the current state of the dialing/authentication process. Additionally, the dialog box (64) contains a cancel button (66) that may be used to terminate the connection at any time during the dialing/authentication process.

Figure 6:
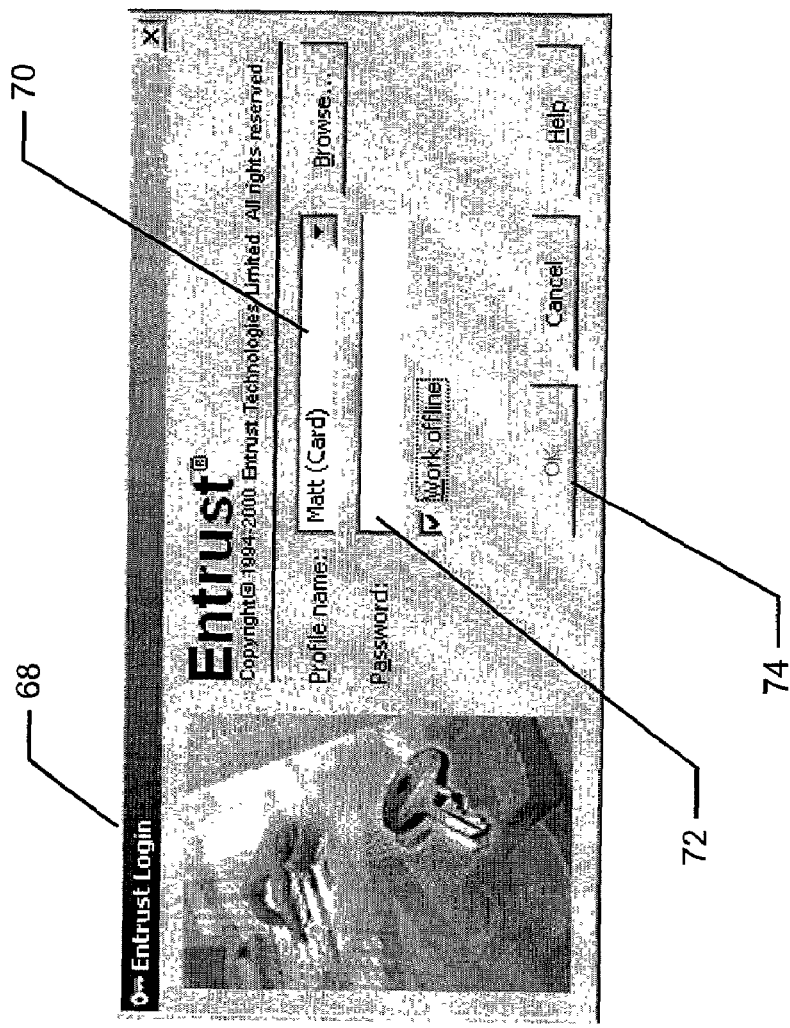
FIG. 6 illustrates a password input dialog box, in accordance with one or more embodiments of the present invention.

A typical input dialog box for a user name and password, in accordance with one or more embodiments of the present invention, is shown in FIG. 6. A dialog box (68) contains a drop-down text input field (70) to select a user profile name and a text input field (72) to enter a user password. Once the user has entered both the user profile name and password, an OK button (74) may be clicked to continue the dialing/authentication process.

Figure 7:
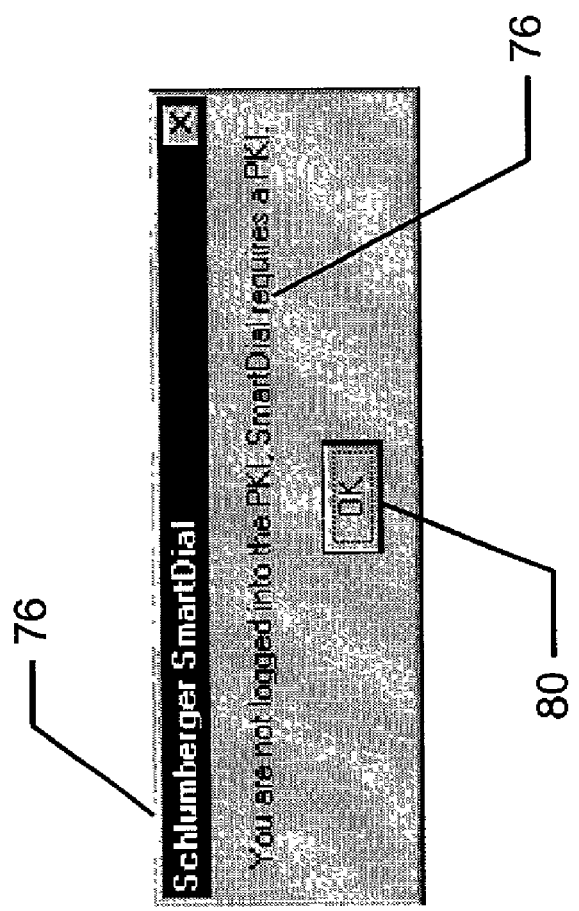
FIG. 7 illustrates an error dialog box, in accordance with one or more embodiments of the present invention.

A typical error dialog box, in accordance with one or more embodiments of the present invention, is shown in FIG. 7. A dialog box (76) contains a text message field (78) indicating an error that was encountered. An OK button (80) may be clicked to continue running the SmartDial application.

The PKI-Bridge (124) resides on the server (112) and uses the RADIUS Software Development Kit (SDK). The PKI-Bridge (124) is the interface on the server (112) that supports the integration of the server (112) and the server-side cryptographic function (130), for CHAP authentication. The PKI-Bridge (124) forwards a challenge string from the server-side cryptographic function (130) to the client computer (102).

Further, the PKI-Bridge (124) reconstructs the signed response packets, sent from the client computer (102) and forwards them to the server-side cryptographic function (130). The signed response string is verified by the server-side cryptographic function (130). If the verification is successful, the server (112) is instructed, by the server-side cryptographic function (130) via the PKI-Bridge (124), to send an allow connection message to the Remote Access Switch (110). If the verification is unsuccessful, the server (112) is instructed, by the server-side cryptographic function (130) via the PKI-Bridge (124), to send a deny connection message to the Remote Access Switch (110). For security purposes, the PKI-Bridge (124) does not store the challenge string or the signed response. The PKI-Bridge (124) constructs a random string of characters for the challenge string based on a timestamp, the previous response, and a randomly generated number. The challenge string is only valid for one session and times out after a configurable time period.

In an embodiment of the present invention, the client-side cryptographic function (128) and the server-side cryptographic function (130) are developed by the same vendor and employ the same cryptographic scheme.

In another embodiment of the present invention, the client-side cryptographic function (128) and the server-side cryptographic function (130) are developed by different vendors and employ the same cryptographic scheme.

Figure 8:
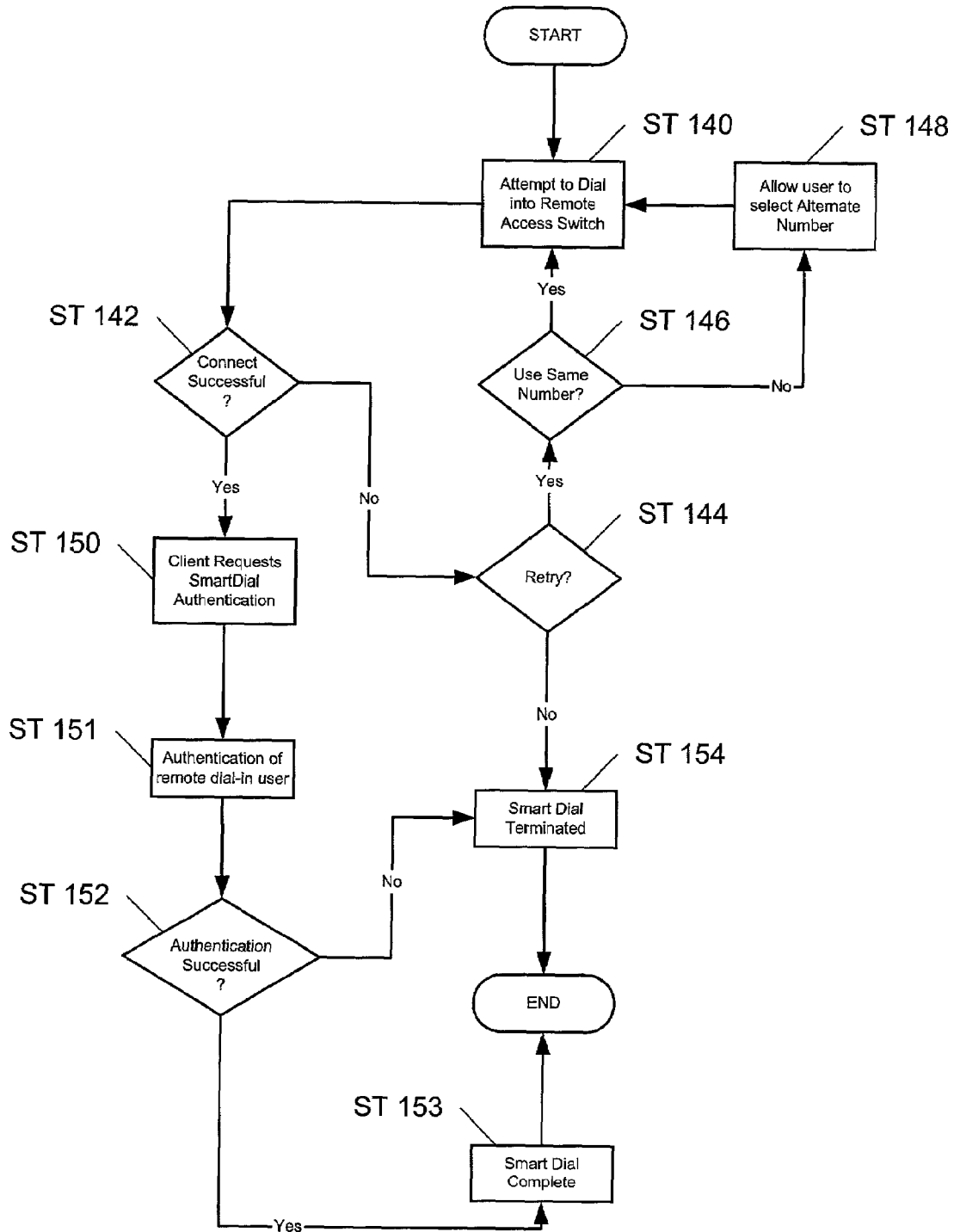
FIG. 8 illustrates a flow chart describing a process, in accordance with one or more embodiments of the present invention.

Referring to FIG. 8, a typical implementation of SmartDial starts with a user attempting to dial into the Remote Access Switch (110) (Step 140). If the attempt to connect to the Remote Access Switch (110) is unsuccessful (Step 142), a dialog box appears to ask whether to retry the attempt to dial into the Remote Access Switch (110) (Step 144). If the user chooses not to retry, SmartDial terminates (Step 164). If the user chooses to retry, a dialog box for determining whether the same access number should be used appears (Step 146). If the user chooses the same access number, the process starts again with an attempt to dial into the Remote Access Switch (110) (Step 140). If the user chooses not to use the same number, an alternate number is then selected by the user (Step 148) and the process starts again with an attempt to dial into the Remote Access Switch (110) (Step 140).

If the attempt to connect to the Remote Access Switch (110) is successful (step 142), the client computer (102) requests a SmartDial authentication through the Remote Access Switch (110) to the server (112) (Step 150). In one embodiment of the present invention, the request and all the subsequent data transmission between the client computer (102) and the Remote Access Switch (110) is conducted via a hidden terminal using a 64-bit encoding. The SmartDial system proceeds to authenticate the dial-up user (Step 151). If authentication is successful (Step 152), SmartDial is complete (Step 153). If authentication is not successful, SmartDial terminates (154).

Figure 9:
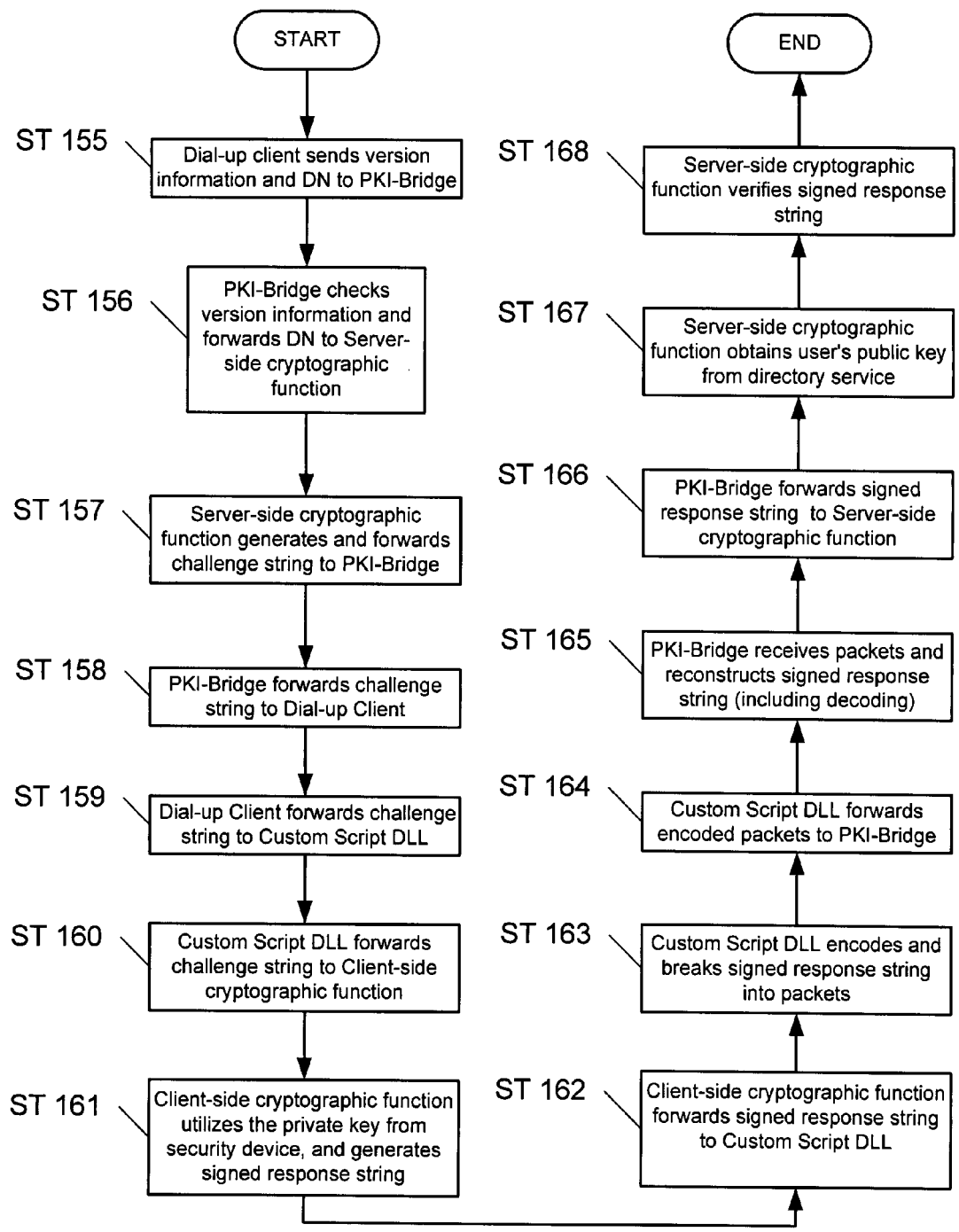
FIG. 9 illustrates a flow chart describing a process, in accordance with one or more embodiments of the present invention.

FIG. 9 provides a more detailed explanation of the authentication of the dial-in user referred to as Step 151 in FIG. 8. A dial-up client (120) sends version information and a distinguished name (DN) of a dial-up client user to a PKI-Bridge (124) via the RAS (110) (Step 155). The PKI-Bridge (124) checks the version information and forwards the DN to the server-side cryptographic function (130) (Step 156). The server-side cryptographic function (130) generates a challenge string and forwards it to the PKI-Bridge (124) (Step 157). An example of the challenge string is described in detail below.

Next, the PKI-Bridge (124) forwards the challenge string to the dial-up client (120) (Step 158). The dial-up client (120) forwards the challenge string to the Custom Script DLL (122) (Step 159). The Custom Script DLL (122) forwards the challenge string to the client-side cryptographic function (128) (Step 160). The client-side cryptographic function (128) uses the dial-up user's private key on security device, and generates a signed response string (Step 161). In one embodiment of the invention, the signed response string is generated by the client-side cryptographic function (128) with the dial-up user's private key never being transferred off the security device. An example of the signed response string is described in detail below.

Next, the client-side cryptographic function (128) forwards the signed response string to the Custom Script DLL (122) (Step 162). The Custom Script DLL (122) encodes the signed response string and divides the encoded signed response string into packets (Step 163). The Custom Script DLL (122) forwards the packets to the PKI-Bridge via dial-up client (120) and RAS (110) (Step 164).

The PKI-Bridge (124) receives the packets, reconstructs the encoded signed response string, and decodes the encoded response string (Step 165). The PKI-Bridge (124) forwards the reconstructed signed response string to the server-side cryptographic function (130) (Step 166). The server-side cryptographic function (130) obtains the user's public key from a directory server (114) using the DN provided by the dial-up user (Step 167). The server-side cryptographic function (130) then verifies the reconstructed signed response string (Step 168).

In accordance with one or more embodiments, the client computer (102) responds to a challenge from the server-side cryptographic function (130) when connecting via SmartDial. The server-side cryptographic function (130) generates a random challenge for the client computer (102). To ensure that this challenge is not easily predictable, it is based on three factors: last sent challenge, current server time, and a randomly generated number. The entire challenge string is 16 octets in length. A summary of an authentication packet sent by the server (112) is shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Code      |  Identifier   |           Length              |
+-+-+-+-+-+-+-+-+-+-+-+-+-+-+-+-+-+-+-+-+-+-+-+-+-+-+-+-+-+-+-+-+
|     Type      |          ChallengeVal. . .                    |
+-+-+-+-+-+-+-+-+-+-+-+-+-+-+-+-+-+-+-+-+-+-+-+-+-+-+-+-+-+-+-+-+
|         . . .ChallengeVal. . .                                |
+-+-+-+-+-+-+-+-+-+-+-+-+-+-+-+-+-+-+-+-+-+-+-+-+-+-+-+-+-+-+-+-+
|         . . .ChallengeVal. . .                                |
+-+-+-+-+-+-+-+-+-+-+-+-+-+-+-+-+-+-+-+-+-+-+-+-+-+-+-+-+-+-+-+-+
|         . . .ChallengeVal. . .                                |
+-+-+-+-+-+-+-+-+-+-+-+-+-+-+-+-+-+-+-+-+-+-+-+-+-+-+-+-+-+-+-+-+
|. . .ChallengeVal|
+-+-+-+-+-+-+-+-+-+
```

For the purposes of the summary of the authentication packet, a Code field value is 1. An Identifier field is one octet and aids in matching responses with requests. The Identifier field is changed on each request packet containing a different identifier. A Length field value is 21. The Type field value is to be determined by the Internet Assigned Numbers Authority (IANA). IANA is an organization that assigns protocol identification numbers. A ChallengeVal field is 16 octets of data, which is generated in a way to not be predictable by anyone. The ChallengeVal is sent only once, including those cases where no reply is given and the server re-transmits a challenge authentication packet.

In accordance with one or more embodiments, the client computer (102) uses the server-side cryptographic function (130) to perform normal certificate retrieval and signing functions when replying to the challenge. An example of a correct response to the challenge authentication packet from the server (112) is shown below.

For the purposes of the correct response to the challenge authentication packet from the server (112), the Code field is 2. The identifier field is one octet and matches the Identifier field from the corresponding request. The Length field is a two octet field and indicates the length of the authentication reply packet including the Code, Identifier, Length, Type, Certificate, Random Data, Echo Value, Signature Length, and Signature fields. The Type field value is to be determined by the IAAN. A Certificate Type field identifies the type of certificate the dial-up client (120) is presenting. In this implementation, the Certificate Type field is set to 1 to represent a X.509 certificate. The Certificate field is the dial-up client's (120) X.509 certificate from the server-side cryptographic function (130). The ResponseVal field is a sixteen-octet field. The field is generated by the dial-up client (120) in such a way that a hacker cannot predict the field. A shared secret is added to the initial

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Code      |  Identifier   |           Length              |
+-+-+-+-+-+-+-+-+-+-+-+-+-+-+-+-+-+-+-+-+-+-+-+-+-+-+-+-+-+-+-+-+
|     Type      |   Cert Type   |     Certificate. . .          |
+-+-+-+-+-+-+-+-+-+-+-+-+-+-+-+-+-+-+-+-+-+-+-+-+-+-+-+-+-+-+-+-+
|       ResponseVal. . .                                        |
+-+-+-+-+-+-+-+-+-+-+-+-+-+-+-+-+-+-+-+-+-+-+-+-+-+-+-+-+-+-+-+-+
|         . . .ResponseVal. . .                                 |
+-+-+-+-+-+-+-+-+-+-+-+-+-+-+-+-+-+-+-+-+-+-+-+-+-+-+-+-+-+-+-+-+
|         . . .ResponseVal. . .                                 |
+-+-+-+-+-+-+-+-+-+-+-+-+-+-+-+-+-+-+-+-+-+-+-+-+-+-+-+-+-+-+-+-+
|         . . .ResponseVal. . .                                 |
+-+-+-+-+-+-+-+-+-+-+-+-+-+-+-+-+-+-+-+-+-+-+-+-+-+-+-+-+-+-+-+-+
|       ChallengeVal. . .                                       |
+-+-+-+-+-+-+-+-+-+-+-+-+-+-+-+-+-+-+-+-+-+-+-+-+-+-+-+-+-+-+-+-+
|         . . .ChallengeVal. . .                                |
+-+-+-+-+-+-+-+-+-+-+-+-+-+-+-+-+-+-+-+-+-+-+-+-+-+-+-+-+-+-+-+-+
|         . . .ChallengeVal. . .                                |
+-+-+-+-+-+-+-+-+-+-+-+-+-+-+-+-+-+-+-+-+-+-+-+-+-+-+-+-+-+-+-+-+
|         . . .ChallengeVal. . .                                |
+-+-+-+-+-+-+-+-+-+-+-+-+-+-+-+-+-+-+-+-+-+-+-+-+-+-+-+-+-+-+-+-+
| Signature Len |  Signature. . .
+-+-+-+-+-+-+-+-+-+-+-+-+-+-+-+-+
``` challenge and a pre-determined hashing algorithm is used so that the secret is not sent insecurely across a wire.

The ChallengeVal field is a sixteen-octet field that matches the ChallengeVal that appeared in a corresponding request packet. The Signature Length field is the length in octets of a signature. The signature field is the signature of the client computer (102) applied to the combination of ChallengeVal and ResponseVal. The client computer (102) takes the thirty-two octets formed by the ChallengeVal followed by the ResponseVal and produces a secure hash known by the server-side cryptographic function (130). The 128-bit message is then signed by the client-side cryptographic function (128) using the dial-up user's (120) private key. To verify this signature, the server-side cryptographic function (128) verifies the dial-up user's (120) signature using the dial-up user's (120) public key. The server-side cryptographic function (128) also produces a 128-bit hash using the ChallengeVal followed by the ResponseVal. The two results are then compared for equality.

In one or more embodiments, various different configurations of SmartDial may be implemented. Referring back to FIG. 3, the dial-up client (120) may be isolated from the modem by a plurality of device drivers (140). For example, the Microsoft® telephony API (TAPI). The security management system insulates SmartDial from the device that contains the certificate (i.e., smart card). SmartDial supports any device for storage of a certificate that is supported by the security management system.

In a particular embodiment, SmartDial may support only certificates issued by Entrust/Entelligence and only interfaces using the Entrust tool kit. SmartDial may support Steel Belted RADIUS (131) and use an SDK provided by Funk Software to interface with the LDAP-compliant directory service (113) and an Entrust toolkit of high level APIs (130) on the server (112). The dial-up client (120) may support Microsoft® Windows NT and/or Windows 2000. In one embodiment, the certificate is managed by and is the responsibility of an external management system. Management of the smart card (106) may be external to SmartDial. Any security device (106) and card reader (104) that is supported by a Security Management System with a client-side cryptographic function (128) may be supported by SmartDial. Those skilled in the art will appreciate that the present invention is applicable to various other platforms and may be implemented in other ways.

Advantages of the present invention may include one or more of the following. SmartDial provides a secure way to handle network security with remote dial-up clients. SmartDial is a PKI-based authentication via dial-up connection while using security devices to digitally sign challenge. The private key is secure, as the key never leaves the card. SmartDial also supports two-way verification. Secure communication is also provided between the Remote Access Switch and the Server. SmartDial is also advantageous because the system uses industry standards to facilitate transition from existing methods. Because preexisting components are used, SmartDial can be integrated into existing systems to allow other trusted systems to perform authentication until all components are installed.

SmartDial is also advantageous because the system supports numerous protocols, including PPP, CHAP, EAP, RADIUS, and LDAP. Because SmartDial's Authentication Protocol is modeled after EAP, the implementation of SmartDial could easily tie into a Virtual Private Network (VPN) system to create end-to-end security when deemed necessary or cost effective. SmartDial uses PKI and can generate access tokens or encrypt data. Thus, the system can be extended to almost any VPN solution. Also, the software does not require any specialized training or skills to use and user documentation is included in the form of an on-line context sensitive help system. Those skilled in the art will appreciate that the present invention may have further advantages.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network system providing integration, comprising:
a remote access switch providing an interface between a client computer and a server, wherein all communications between the client computer and the server are transmitted via the remote access switch;
a client-side cryptographic function providing cryptographic services located on the client computer;
a server-side cryptographic function providing cryptographic services located on the server;
the client computer, configured to dial into the remote access switch, comprising:
a dial-up client for dialing the remote access switch; and
a custom script dynamically linked library providing an interface between the dial-up client and the client-side cryptographic function;
wherein the dial-up client is an executable file that loads and executes code in the custom script dynamically linked library;
the server, configured to connect to the remote access switch via a wide area network, comprising:
a PKI-Bridge providing an interface between the server and the server-side cryptographic function,
wherein the PKI-Bridge is configured to check version information of a client computer and send an identification to the server-side cryptographic function,
wherein the server-side cryptographic function is configured to generate a challenge string in response to the identification,
wherein the client-side cryptographic function is configured to generate a signed response string in response to the challenge string,
wherein the custom script dynamically linked library is configured to encode and divide the signed response string to obtain a plurality of packets,
wherein the PKI-Bridge is configured to combine and decode the plurality of packets to obtain a reconstructed signed response string,
wherein the server-side cryptographic function is configured to verify the reconstructed signed response string to generate a result, and
wherein the server-side cryptographic function is configured to send an instruction based on the result to the server via the PKI-Bridge, wherein the instruction specifies whether the server should send an allow connection message to the remote access switch.

2. The network system of claim 1, further comprising:
a security device holding authentication information; and
a security device reader attached to the client computer for reading the security device.

3. The network system of claim 2, wherein a certificate is stored on the security device.

4. The network system of claim 2, wherein the security device is a smart card.

5. The network system of claim 1, further comprising:
a directory service accessed by the server-side cryptographic function.

6. The network system of claim 5, wherein the directory service is lightweight directory access protocol compliant.

7. The network system of claim 1, wherein the client-side cryptographic function and the server-side cryptographic function employ the same cryptographic scheme.

8. The network system of claim 1, wherein the server-side cryptographic function uses a random number generator to generate the challenge string.

9. The network system of claim 1, wherein a client-side cryptographic function uses a random number generator to generate the signed response string.

10. The network system of claim 1, wherein the dial-up client operates in terminal mode.

11. A network system providing integration, comprising:
a remote access switch providing an interface between a client computer and a server, wherein all communications between the client computer and the server are transmitted via the remote access switch;
a client-side cryptographic function providing cryptographic services located on the client computer;
a server-side cryptographic function providing cryptographic services located on the server;
the client computer, configured to dial into the remote access switch, comprising:
  a dial-up client for dialing the remote access switch; and
  a custom script dynamically linked library providing an interface between the dial-up client and the client-side cryptographic function;
  wherein the dial-up client is an executable file that loads and executes code in the custom script dynamically linked library;
the server, configured to connect to the remote access switch via a wide area network, comprising:
  a PKI-Bridge providing an interface between the server and the server-side cryptographic function,
  a security device holding authentication information;
  a security device reader attached to the client computer for reading the security device; and
  a directory service accessed by the server-side cryptographic function,
wherein the PKI-Bridge is configured to check version information of a client computer and send an identification to the server-side cryptographic function;
wherein the server-side cryptographic function is configured to generate a challenge string in response to the identification,
wherein the client-side cryptographic function is configured to generate a signed response string in response to the challenge string,
wherein the custom script dynamically linked library is configured to encode and divide the signed response string to obtain a plurality of packets,
wherein the PKI-Bridge is configured to combine and decode the plurality of packets to obtain a reconstructed signed response string,
wherein the server-side cryptographic function is configured to verify the reconstructed signed response string to generate a result; and
wherein the server-side cryptographic function is configured to send an instruction based on the result to the server via the PKI-Bridge, wherein the instruction specifies whether the server should send an allow connection message to the remote access switch.

12. A client computer comprising:
a dial-up client for dialing a remote access switch, wherein the dial-up client executes on the client computer, and wherein all communications between the client computer and a server are transmitted via the remote access switch;
a client-side cryptographic function providing cryptographic services located on the client computer; and
a custom script dynamically linked library providing an interface between the dial-up client and the client-side cryptographic function,
wherein the dial-up client is an executable file that loads and executes code in the custom script dynamically linked library,
wherein the client-side cryptographic function is configured to generate a signed response string in response to a challenge string from a server, and
wherein the custom script dynamically linked library is configured to encode and divide the signed response string to obtain a plurality of packets.

13. The client computer of claim 12, further comprising:
a security device reader attached to the client computer for reading a security device.

14. The client computer of claim 13, wherein the security device is a smart card.

15. The client computer of claim 12, wherein the custom script dynamically linked library comprises a SDLogin component and a SDSetupDial component.

16. The client computer of claim 12, wherein the dial-up client automates the authentication process using a hidden terminal operating in terminal mode.

17. A client computer comprising:
a dial-up client for dialing a remote access switch, wherein the dial-up client executes on the client computer;
a client-side cryptographic function providing cryptographic services located on the client computer; and
a custom script dynamically linked library providing an interface between the dial-up client and the client-side cryptographic function, and
a security device reader attached to the client computer for reading a security device,
wherein all communications between the client computer and a server are transmitted via the remote access switch;
wherein the dial-up client is an executable file that loads and executes code in the custom script dynamically linked library,
wherein the client-side cryptographic function is configured to generate a signed response string in response to a challenge string from a server, and
wherein the custom script dynamically linked library is configured to encode and divide the signed response string to obtain a plurality of packets.

18. A server configured to connect to a remote access switch via a wide area network, comprising:
a server-side cryptographic function providing cryptographic services located on the server; and
a PKI-Bridge providing an interface between the server and the server-side cryptographic function, wherein the PKI-Bridge is configured to check version information of a client and send an identification to the server-side cryptographic function;

wherein the server-side cryptographic function is configured to generate a challenge string in response to identification from the client, wherein the PKI-Bridge is configured to combine and decode a plurality of packets to obtain a reconstructed signed response string which is a response to the challenge string, wherein the server-side cryptographic function is configured to verify the reconstructed signed response string to generate a result;

wherein the server-side cryptographic function is configured to send an instruction to the server via the PKI-Bridge, wherein the instruction specifies whether the server should send an allow connection message to the remote access switch based on the result, and wherein all communications between the client and the server are transmitted via the remote access switch.

19. The server of claim 18, further comprising:
a directory service accessed by the server-side cryptographic function.

20. A server configured to connect to a remote access switch via a wide area network, comprising:
a server-side cryptographic function providing cryptographic services located on the server;
a PKI-Bridge providing an interface between the server and the server-side cryptographic function, wherein the PKI-Bridge is configured to check version information of a client and send an identification to the server-side cryptographic function; and
a directory service accessed by the server-side cryptographic function,
wherein the server-side cryptographic function is configured to generate a challenge string in response to identification from the client,
wherein the PKI-Bridge is configured to combine and decode a plurality of packets to obtain a reconstructed signed response string which is a response to the challenge string,
wherein the server-side cryptographic function is configured to verify the reconstructed signed response string to generate a result;
wherein the server-side cryptographic function is configured to send an instruction to the server via the PKI-Bridge, wherein the instruction specifies whether the server should send an allow connection message to the remote access switch based on the result; and
wherein all communications between the client and the server are transmitted via the remote access switch.

21. A method of integrating via a dial-up interface, comprising:
sending session initiation information from a dial-up client to a PKI-Bridge, wherein the dial-up client is an executable file that loads and executes code in a custom script dynamically linked library;
checking session initiation information by the PKI-Bridge;
generating a challenge string by a server-side cryptographic function in response to the session initiation information;
forwarding the challenge string to the custom script dynamically linked library;
forwarding the challenge string to a client-side cryptographic function from the custom script dynamically linked library;
utilizing a private key from a security device;
generating a response string in response to the challenge string;

signing the response string with the private key of a dial-in user to obtain a signed response string;
forwarding the signed response string to the custom script dynamically linked library;
encoding the signed response string to obtain an encoded signed response string;
dividing the encoded signed response string into a plurality of packets;
forwarding the plurality of packets to the PKI-Bridge;
combining the plurality of packets to obtain a reconstructed encoded signed response string;
decoding the reconstructed encoded signed response string to obtain a reconstructed signed response string;
forwarding the reconstructed signed response string to the server-side cryptographic function;
obtaining a public key of the dial-in user;
verifying the reconstructed signed response string based on the public key using the server-side cryptographic function to generate a result; and
sending an instruction to a server from the server-side cryptographic function via the PKI-Bridge, wherein the instruction specifies whether the server should send an allow connection message to a remote access switch based on the result,
wherein the server is connected to the remote access switch via a wide area network;
wherein the dial-up client is configured to dial into the remote access switch; and
wherein all communications from the dial-up client and from the server are transmitted via the remote access switch.

22. The method of claim 21, further comprising:
reading the security device by a security device reader.

23. The method of claim 21, further comprising:
forwarding the challenge string to the dial-up client; and
forwarding the challenge string to the PKI-Bridge.

24. The method of claim 21, further comprising:
forwarding the plurality of packets from the custom script dynamically linked library.

25. The method of claim 21, wherein the security device is a smart card.

26. The method of claim 21, wherein the session initiation information comprises version information and a distinguished name.

27. The method of claim 21, wherein the public key is stored on a directory service.

28. The method of claim 27, wherein the directory service is lightweight directory access protocol compliant.

29. A method of integrating via a dial-up interface, comprising:
sending session initiation information from a dial-up client to a PKI-Bridge, wherein the dial-up client is an executable file that loads and executes code in a custom script dynamically linked library;
checking session initiation information by the PKI-Bridge;
generating a challenge string by a server-side cryptographic function in response to the session initiation information;
forwarding the challenge string to the custom script dynamically linked library;
forwarding the challenge string to a client-side cryptographic function from the custom script dynamically linked library;
utilizing a private key from a security device;
generating a response string in response to the challenge string;

signing the response string with the private key of a dial-in user to obtain a signed response string;

forwarding the signed response string to the custom script dynamically linked library;

encoding the signed response string to obtain an encoded signed response string;

dividing the encoded signed response string into a plurality of packets;

forwarding the plurality of packets to the PKI-Bridge;

combining the plurality of packets to obtain a reconstructed encoded signed response string;

decoding the reconstructed encoded signed response string to obtain a reconstructed signed response string;

forwarding the reconstructed signed response string to the server-side cryptographic function;

obtaining a public key of the dial-in user; and verifying the reconstructed signed response string based on the public key using the server-side cryptographic function;

reading the security device by a security card reader;

forwarding the challenge string to the dial-up client;

forwarding the challenge string to the PKI-Bridge; and forwarding the plurality of packets from the custom script dynamically linked library;

wherein the server is connected to a remote access switch via a wide-area network;

wherein the dial-up client is configured to dial into the remote access switch; and wherein all communications from the dial-up client and from the server are transmitted via the remote access switch.

30. An apparatus of integrating via a dial-up interface, comprising:

means for sending session initiation information from a dial-up client to a PKI-Bridge, wherein the dial-up client is an executable file that loads and executes code in a custom script dynamically linked library;

means for checking session initiation information by the PKI-Bridge;

means for generating a challenge string by a server-side cryptographic function in response to the session initiation information;

means for forwarding the challenge string to the custom script dynamically linked library;

means for forwarding the challenge string to a client-side cryptographic function from the custom script dynamically linked library;

means for utilizing a private key from a security device;

means for generating a response string in response to the challenge string;

means for signing the response string with the private key of a dial-in user to obtain a signed response string;

means for forwarding the signed response string to the custom script dynamically linked library;

means for encoding the signed response string to obtain an encoded signed response string;

means for dividing the encoded signed response string into a plurality of packets;

means for forwarding the plurality of packets to the PKI-Bridge;

means for combining the plurality of packets to obtain a reconstructed encoded signed response string;

means for decoding the reconstructed encoded signed response string to obtain a reconstructed signed response string;

means for forwarding the reconstructed signed response string to the server-side cryptographic function;

means for obtaining a public key of the dial-in user;

means for verifying the reconstructed signed response string based on the public key using the server-side cryptographic function to generate a result; and means for sending an instruction to a server from the server-side cryptographic function via the PKI-Bridge, wherein the instruction specifies whether the server should send an allow connection message to a remote access switch based on the result;

wherein the server is connected to the remote access switch via a wide area network;

wherein the dial-up client is configured to dial into the remote access switch; and wherein all communications from the dial-up client and from the server are transmitted via the remote access switch.

* * * * *